Patented Jan. 4, 1938

2,104,304

UNITED STATES PATENT OFFICE 2,104,304

MANUFACTURE OF ROCK AND RYE

Jacob Kaplan, Boston, Mass., assignor to Ben-Burk, Inc., Boston, Mass., a corporation of Massachusetts No Drawing. Application July 23, 1936, Serial No. 92,160

1 Claim. (Cl. 99—48)

This invention relates to the manufacture of alcoholic beverages of the type comprising whiskey and whole or cut fruits, and pertains more particularly to the production of a liquor known as rock and rye. The principal object of the invention is to prepare a beverage of this character in such a manner that the fruit portions do not become discolored by absorption of wood coloring from the whiskey.

In the usual method of manufacture heretofore practiced, rock and rye is prepared by adding a mixture of rock candy or rock candy syrup, flavoring ingredients and portions of fresh fruit, to a straight rye whiskey, the whiskey constituting at least fifty-one per cent of the resulting product. Ordinary straight rye whiskey is aged in the wood and absorbs tannin and wood colors which produce the characteristic color of this liquor and which also discolor the fruits to such an extent that a rock and rye made from rye whiskey presents a distinctly objectionable appearance. Although the blackening or discoloration of the fruit pieces is not harmful and does not materially affect the flavor, the product has the appearance of containing overripe and distasteful fruit. As a result, rock and rye is not a popular beverage, despite its wholesomeness.

Efforts have been made to inhibit such discoloration by treating the fruit with a syrup acidified with citric or other acids; but this method is only partially effective, not uniformly positive, and quite troublesome.

It is, therefore, the purpose of the present invention to eliminate this objectionable discoloration, and to produce a rock and rye or other liquor containing fruits, which will be pleasing in appearance as well as in flavor, without preliminary treatment of the fruit. This object is preferably achieved by removing the tannin and wood color from the rye whiskey before the fruit portions are added, so that fruit pieces in the resulting rock and rye liquor will maintain their original coloring and appearance even after long standing.

The manufacture of the improved product is preferably accomplished by redistilling the rye whiskey in a steam-jacketed pot still, or other suitable distilling or refining apparatus, in such a manner that the tannin and wood color are effectually removed. Although other non-volatile matter will also be removed by this process, the redistilled whiskey will be practically the same as the original straight rye, except for the absence of the wood coloring. If it is desirable to restore the characteristic whiskey color, I prefer to add caramel or other artificial coloring extracts which are absorbed to a very slight extent, if at all, by some of the fibrous portions of the fruit.

Using this tannin-free whiskey (with or without added color) as a base, the improved rock and rye is then prepared by adding any suitable or customary mixture of rock candy or syrup, flavoring ingredients and whole or cut fruits, such as lemons, oranges, pineapples or the like. The product will thus be free of the tannin or wood coloring which has heretofore caused discoloration of the fruit, and the fruit will maintain its original appearance.

I claim:

A process of making a rock and rye liquor, which consists in redistilling rye whiskey to remove its tannin and wood color without appreciably affecting its characteristic rye flavor, then adding pieces of fruit and rock candy flavoring to the treated whiskey, and adding artificial coloring to restore the characteristic whiskey color, thereby to produce a fruit beverage in which the fruit pieces will maintain their natural appearance, free from the discoloration which normally results from absorption of coloring matter in ordinary rye whiskey.

JACOB KAPLAN.